United States Patent
Sundermeyer et al.

(10) Patent No.: US 9,953,098 B2
(45) Date of Patent: *Apr. 24, 2018

(54) METHODS AND SYSTEMS FOR WEBSITE EDITING

(75) Inventors: Michael J. Sundermeyer, Palo Alto, CA (US); Narciso B. Jaramillo, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1301 days.

This patent is subject to a terminal disclaimer.

(21) Appl. No.: 13/033,700

(22) Filed: Feb. 24, 2011

(65) Prior Publication Data

US 2014/0250364 A1    Sep. 4, 2014

Related U.S. Application Data

(63) Continuation of application No. 10/690,214, filed on Oct. 21, 2003, now Pat. No. 7,941,748.

(51) Int. Cl.
G06F 17/00    (2006.01)
G06F 17/30    (2006.01)
G06F 17/24    (2006.01)

(52) U.S. Cl.
CPC ........ *G06F 17/3089* (2013.01); *G06F 17/243* (2013.01)

(58) Field of Classification Search
CPC . G06F 17/24; G06F 17/30011; G06F 17/3089
USPC ................................................. 715/255, 760
See application file for complete search history.

(56) References Cited

U.S. PATENT DOCUMENTS

| | | |
|---|---|---|
| 5,572,643 A | 11/1996 | Judson |
| 5,778,389 A | 7/1998 | Pruett et al. |
| 5,892,908 A | 4/1999 | Hughes et al. |
| 6,012,071 A | 1/2000 | Krishna |
| 6,061,692 A | 5/2000 | Thomas et al. |
| 6,061,697 A | 5/2000 | Nakao et al. |
| 6,078,929 A | 6/2000 | Rao |
| 6,145,003 A | 11/2000 | Sanu et al. |
| 6,148,289 A | 11/2000 | Virdy et al. |
| 6,167,453 A | 12/2000 | Becker et al. |
| 6,385,606 B2 | 5/2002 | Inohara et al. |
| 6,393,420 B1 | 5/2002 | Peters |
| 6,516,337 B1 | 2/2003 | Tripp et al. |
| 6,519,626 B1 | 2/2003 | Soderberg et al. |
| 6,626,957 B1 | 9/2003 | Lippert et al. |

(Continued)

OTHER PUBLICATIONS

Office Action dated Feb. 5, 2009 in related U.S. Appl. No. 11/019,101.

(Continued)

*Primary Examiner* — Stephen Hong
*Assistant Examiner* — Matthew Ludwig
(74) *Attorney, Agent, or Firm* — Kilpatrick Townsend & Stockton LLP

(57) ABSTRACT

A system and method for maintaining a web site is disclosed that includes browsing to a web page to be edited, automatically downloading a source file for the web page including related files associated with display of the web page, editing the source file, and automatically publishing the edited source file to a file transfer server associated with the web site including the related files associated with the display of the web page.

20 Claims, 6 Drawing Sheets

(56) References Cited

U.S. PATENT DOCUMENTS

| | | | |
|---|---|---|---|
| 6,629,127 B1 | 9/2003 | Heaney et al. | |
| 6,822,663 B2* | 11/2004 | Wang et al. | 715/854 |
| 6,823,478 B1 | 11/2004 | Prologo et al. | |
| 6,944,658 B1 | 9/2005 | Schneider | |
| 6,959,288 B1 | 10/2005 | Medina et al. | |
| 6,985,936 B2 | 1/2006 | Argarwalla et al. | |
| 6,990,629 B1 | 1/2006 | Heaney et al. | |
| 7,117,504 B2 | 3/2006 | Smith et al. | |
| 7,032,000 B2 | 4/2006 | Tripp | |
| 7,062,506 B2 | 6/2006 | Taylor et al. | |
| 7,086,050 B2 | 8/2006 | Barton et al. | |
| 7,213,201 B2 | 5/2007 | Brown et al. | |
| 7,246,177 B2* | 7/2007 | Anton | H03M 7/30 709/201 |
| 7,263,534 B1 | 8/2007 | Margulis | |
| 7,269,664 B2 | 9/2007 | Hutsch et al. | |
| 7,281,060 B2 | 10/2007 | Hofmann et al. | |
| 7,287,227 B2* | 10/2007 | Ries | G06F 17/3089 715/205 |
| 7,448,032 B2 | 11/2008 | Boubonnais | |
| 7,457,805 B2 | 11/2008 | Deen et al. | |
| 7,480,910 B1 | 1/2009 | Kuwamoto et al. | |
| 7,809,858 B1 | 10/2010 | Brown | |
| 7,877,488 B1 | 1/2011 | Margulis | |
| 7,904,570 B1 | 3/2011 | Kroupa | |
| 7,921,360 B1* | 4/2011 | Sundermeyer et al. | 715/255 |
| 7,941,748 B1 | 5/2011 | Sundermeyer et al. | |
| 8,832,308 B2* | 9/2014 | Tsutsui | 709/236 |
| 2001/0002470 A1 | 5/2001 | Inohara et al. | |
| 2001/0032220 A1* | 10/2001 | Ven Hoff | 707/513 |
| 2002/0004755 A1* | 1/2002 | Balthaser | 705/26 |
| 2002/0023112 A1* | 2/2002 | Avital | G06F 17/21 715/234 |
| 2002/0073125 A1* | 6/2002 | Bier | 707/530 |
| 2003/0023632 A1 | 1/2003 | Ries et al. | |
| 2003/0061278 A1 | 3/2003 | Agarwalla et al. | |
| 2003/0167317 A1 | 9/2003 | Deen et al. | |
| 2003/0220924 A1 | 11/2003 | Bourbonnais | |
| 2004/0177321 A1 | 9/2004 | Brown et al. | |

OTHER PUBLICATIONS

Office Action dated Oct. 15, 2009 in related U.S. Appl. No. 11/019,101.
Advisory Action dated Dec. 30, 2009 in related U.S. Appl. No. 11/019,101.
Office Action dated Jul. 22, 2010 in related U.S. Appl. No. 11/019,101.
Office Action dated Jul. 21, 2009 in related U.S. Appl. No. 11/841,428.
Office Action dated Jan. 27, 2010 in related U.S. Appl. No. 11/841,428.
Notice of Allowance dated Aug. 27, 2010 in related U.S. Appl. No. 11/841,428.
Office Action dated May 16, 2007 in related U.S. Appl. No. 10/689,860.
Office Action dated Nov. 1, 2007 in related U.S. Appl. No. 10/689,860.
Interview Summary dated Mar. 6, 2008 in related U.S. Appl. No. 10/689,860.
Office Action dated May 5, 2008 in related U.S. Appl. No. 10/689,860.
Office Action dated Oct. 31, 2008 in related U.S. Appl. No. 10/689,860.
Office Action dated Aug. 19, 2009 in related U.S. Appl. No. 10/689,860.
Notice of Allowance dated Feb. 5, 2010 in related U.S. Appl. No. 10/689,860.
Office Action dated Oct. 18, 2006 in related U.S. Appl. No. 10/689,870.
Notice of Allowance dated Apr. 23, 2007 in related U.S. Appl. No. 10/689,870.
Office Action dated Nov. 8, 2005, in related U.S. Appl. No. 10/690,980.
Office Action dated Feb. 27, 2006 in related U.S. Appl. No. 10/690,980.
Office Action dated Jul. 27, 2006 in related U.S. Appl. No. 10/690,980.
Office Action dated Dec. 15, 2006 in related U.S. Appl. No. 10/690,980.
Examiner's Answer to Appeal Brief dated Jul. 30, 2007 in related U.S. Appl. No. 10/690,980.
Decision of BPAI dated Jul. 31, 2009 in related U.S. Appl. No. 10/690,980.
Office Communication dated Nov. 6, 2009 in related U.S. Appl. No. 10/690,980.
Streamling content creation, retrieval, and publishing on the Web, Using TXTML Server and XML Spy 4 Suite in an integrated, web publishing environment, XIASOFT, White Paper Jul. 2002 , pp. 1-16.
XML Spy 4.0 Manual, Chapter 3, Altova Inc. & Altova GmbH, copyright 1998-2001, 91-286.
Berners-Lee, et al., RFC 1738—Uniform Resource Locations (URL),Dec 1994.
"CuteFTP Pro Technical Overview", GlobalScape, White Paper published on the Internet by at least Aug. 14, 2002, http://web.archive.org/web/20020814355609/www.globalscape.com/support/manuals.shtml May 22, 2001, pp. i-ii and 1-17.
CuteFTP Pro, User's Guide, GlobalScape, published on the Internet as of Aug. 14, 2002 from link to: http://web.archive.org/web/20020802160001&www.www.xmlspy.com/resources_wp.html, 1-20.
Dreamweaver TechNote 16416, How to make an inherited editable region uneditable, Jul. 6, 2002, p. 1-4.
Macromedia Dreamweaver MX: Training from the Source, Safari Tech Books Online version, http://proquest.safaribooksonline.com Jul. 23, 2002 , p. 1-39.
Fraternali, Tools and Approaches for Developing Data-Intensive Web Applications: A Survey, ACM Computing Surveys, Sep. 1999, vol. 31(3), pp. 227-263.
Kim, XML Spy, XML Integrated Development Environments, Accelerating XML Application Development in the Enterprise, Altova, Inc. & Altova GmbH 2002, published on the Internet as of Aug. 21, 2002, from link to: http://web.archive.org/web/20020802160016/www.xmlspy.com/resources_wp.html, pp. 1-20.
Office Action dated Mar. 21, 2006 in related U.S. Appl. No. 10/690,214.
Office Action dated Sep. 8, 2006 in related U.S. Appl. No. 10/690,214.
Examiner's Answer to Appeal Brief dated May 31, 2007 in related U.S. Appl. No. 10/690,214.
Decision of BPAI dated Sep. 4, 2009 in related U.S. Appl. No. 10/690,214.
Office Action dated Dec. 29, 2009 in related U.S. Appl. No. 10/690,214.
Office Action dated Jun. 10, 2010 in related U.S. Appl. No. 10/690,214.
Notice of Allowance dated Nov. 30, 2010 in related U.S. Appl. No. 10/690,214.

* cited by examiner

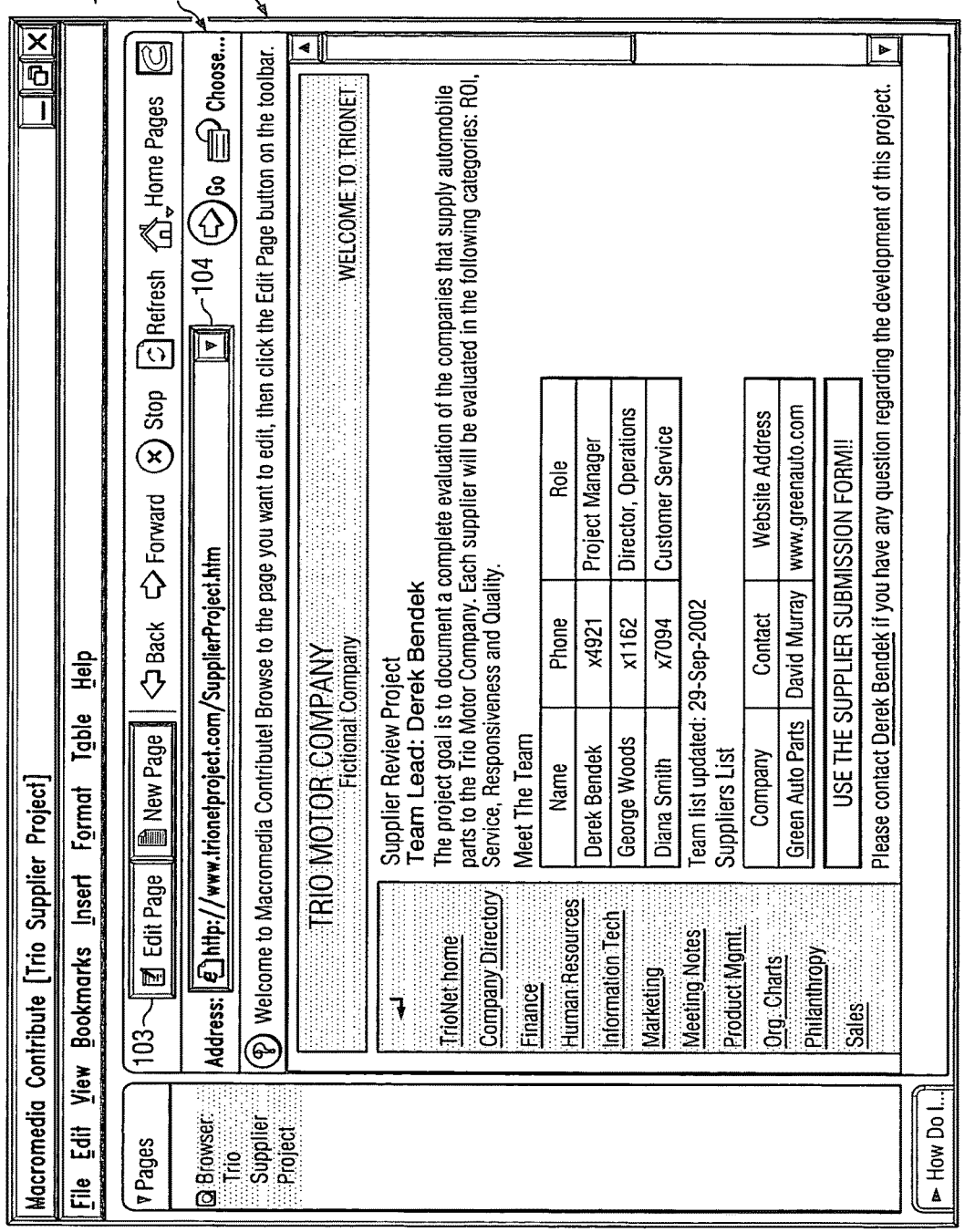

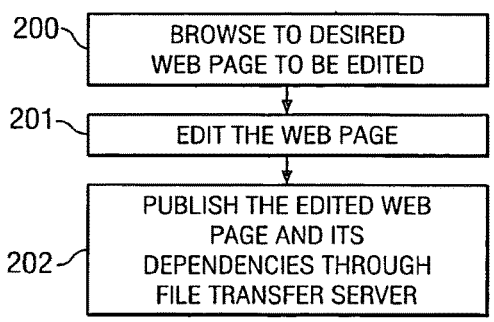
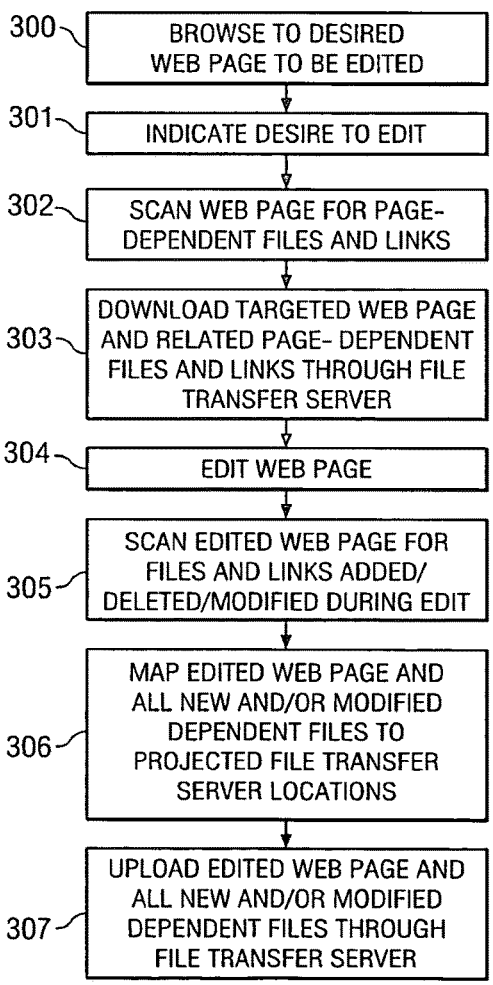
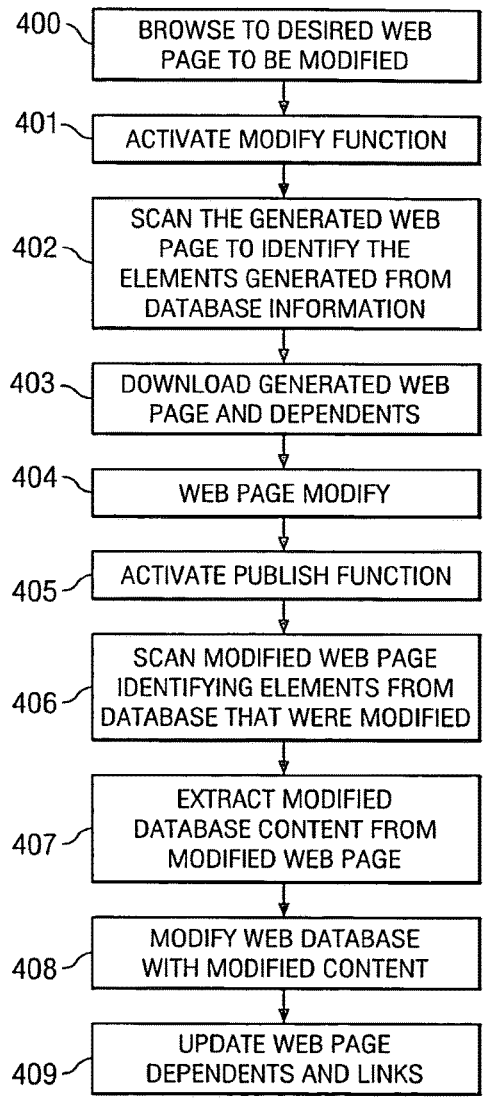

METHODS AND SYSTEMS FOR WEBSITE EDITING

CROSS-REFERENCE TO RELATED APPLICATIONS

The present application is a continuation of U.S. patent application Ser. No. 10/690,214, filed Oct. 21, 2003, entitled "Systems and Methods for Web Site Editing Interfaces," which is incorporated by reference herein in its entirety. This application is related to U.S. patent application Ser. No. 10/690,980, entitled "Content Restricted Editing"; U.S. patent application Ser. No. 10/689,870, entitled "Automatic Set Up for Editing a Web Site" (now U.S. Pat. No. 7,263,534); and U.S. patent application Ser. No. 10/689,860, entitled "Cross-Protocol URL Mapping" (now U.S. Pat. No. 7,809,858), each filed Oct. 21, 2003 and the disclosure of each is hereby incorporated herein by reference.

TECHNICAL FIELD

The present invention relates, in general, to web site development, and, more specifically, to a web site management lifecycle.

BACKGROUND OF THE INVENTION

Companies typically use the World Wide Web to disseminate information both internally, to employees and contractors, and externally, to customers and business partners. This information is usually generated by content contributors or subject matter experts (SMEs), who are typically people with expertise in the information domain, but who are not usually technically skilled. In order to publish this information to the web, or edit the existing information already on a company Internet or Intranet web site, SMEs typically work with technically skilled web professionals or web developers, who generally combine web coding or computer programming skills and graphics design and presentation skills. Skilled web professionals or web developers are an expensive and limited resource. Moreover, multiple web professionals or developers may be used to obtain expertise in both the coding and graphic arts.

Web sites and web pages typically comprise a web server, that serves the visual and data content to the user's browser many times in a format, such as hypertext markup language (HTML), and a file transfer server, that provides read and write-access to the files that make up the visual and data content of the web sites. While web servers and file transfer servers are usually conceptualized as separate and independent machines, they, in fact, are typically software applications, which often time run on the same computer. The underlying web files are usually stored on that computer or a storage device accessible by that computer, while the web server and file transfer server interact with those files in different ways. Web servers typically allow read-only access to the files through HTML browsers, compared to the read/write-access usually allowed by the file transfer servers. Because file transfer servers typically allow read/write-access to web files, general or non-skilled users are not typically given access because changing files through the file transfer server will usually change how those corresponding web pages are served to the accessing browsers. Web professionals spend a great deal of time designing the core of the web sites by using specific formatting or style sheets, relational dependencies between linked documents or pages, and the coding that creates dynamic web experiences. Thus, full access to the inner workings of such web sites and pages is usually limited to the technically-savvy web developers to preserve the stability and operation of the web site. In such cases, even where only minimal changes to the content or information is contemplated, the SMEs typically still work with the web developers to implement those information changes. However, this solution is quite expensive relative to the amount of changes contemplated.

Alternatively, eschewing the dangers, SMEs may be given access to the file transfer server to make information changes. Existing web development environments, such as MACROMEDIA, INC.'S DREAMWEAVER™, MICROSOFT CORPORATION'S FRONTPAGE™, and the like, allow anyone, including SMEs, to edit and eventually publish web pages by themselves. However, these web development environments are typically created for the technically knowledgeable web developers, and, therefore, may be too technically complicated for SMEs to use easily or successfully. The existing web development environments generally assume that the users know (1) where the underlying web files are located in the file structure of the web site; (2) how to configure the various protocols, such as file transfer protocol (FTP), secure FTP (SFTP), local area network (LAN), and the like, typically used to store and access those web files; and (3) how to manage the uploading and downloading of the web files. SMEs and other non-technical users typically do not have the technical knowledge or skill to find or successfully use this information.

Interaction between the file transfer server and the web server is not always a direct one-to-one correspondence. In non-dynamic web sites, a one-to-one correspondence typically exists between files accessed through the file transfer server and the URLs accessed through the web site. In dynamic web sites, a uniform resource locator (URL) may map to a differently-named or located file on the file transfer server. The file transfer server is typically run using a specific transfer protocol, such as FTP, SFTP, LAN, or the like. While the web server delivers HTML content to requesting browsers, it uses hypertext transfer protocol (HTTP) to transfer the requests and resulting HTML content between the user's browser and the web server. Even though both FTP and HTTP are both transfer protocols, they are designed for different purposes and are not necessarily compatible.

For example, the file management system for HTTP will generally be different than that of FTP. HTTP is designed for more limited, yet ready access than FTP. HTTP communications revolve around establishing communication between a browser and a web server in which HTML documents and any supporting documents that correspond to an HTTP request are transmitted from the web server (sometimes called an HTTP server) to the browser to be rendered to the user. An example HTTP request is: http://www.macromedia.com/index.html. The example request would likely be entered by a user into a web browser. The http:// indicates the request is an HTTP request. The www.macromedia.com indicates the specific web server domain to which the request is directed. Index.html is the specific file requested for display. Upon receiving this request, the web server would typically communicate a read-only HTML file to the requesting browser for display. If a user were to enter a bare directory URL, such as http://www.macromedia.com/.an HTTP server would resolve the directory to the index file.

In contrast, FTP includes functions for logging onto the network, listing directories, copying files, and the like. An example FTP command is: ftp://user:password@ftp.macromedia.com. When entered in a browser, the ftp:// indicates that the request is an FTP request. The ftp.macromedia.com is the name of the FTP domain that the user wishes to log onto, and the user: password section is the user's password entry for logging onto the FTP server. Once logged on, the user can download and store files, view directories of the files on the FTP server and the like, depending, in general, on the level of authorization the particular user has for that particular FTP server. However, if the user were looking for the index.html file from the HTTP example, it would likely not be found if the user attempted to access ftp.macromedia.com/index.html. In actual use, the root directory of the file transfer server for www.macromedia.com would likely not be found in ftp://ftp.macromedia.com. For security reasons, the root directory would likely be found in a directory with a dissimilar name. The user would generally need to obtain the FTP path that corresponds to that particular web site. Furthermore, if a bare directory address were entered, such as ftp://ftp.macromedia.com/, an FTP server will usually not resolve the requested directory to access the index file, as with the HTTP server.

In order to access the FTP server, a web designer or developer is generally prompted by the server access application to provide the FTP host name, the FTP login, the FTP password, and the FTP path. While the FTP host name, login, and password are usually the pieces of information that will get the user onto the FTP server, without the FTP root path name, a user will not likely find the location on the FTP server where the underlying web files are located. For most experienced designers or developers all of this information is relatively easy to know and/or obtain. A novice or non-technical user, such as a typical SME, may know the FTP host name, login, and password, but would generally not know the FTP root path; and, without the root path, the FTP server will generally not allow access to the appropriate file locations. Most novice users typically do not have even a basic knowledge of how URLs map to FTP paths. The web master that manages the web site could give this information to the SMEs. However, they are typically reluctant to do so since the possibilities for the SME to corrupt the web site are usually great. Without knowledge of the FTP server system, it would be difficult for an SME to understand the location of the underlying web files, and, thus, how to configure the various protocols or manage the uploading and downloading of the edited web files. Having the web developers assist in information updates or creating a customized system for updating information each offer expensive solutions to the web development lifecycle.

In order to increase the ease of web development and maintenance, web development environments have advanced to automate or abstract some of the more technically oriented tasks involved in web design and publishing. NETSCAPE COMMUNICATIONS CORPORATION's COMPOSER™ implemented a browse-edit paradigm of web maintenance. Most individuals are comfortable and experienced with the concept and act of browsing. Using COMPOSER™, a user could browse to a particular web page that he or she desired to edit and click an "Edit Page" button to edit the underlying web source file. If all of the authorizations and addresses were previously set up, COMPOSER™ would open a separate window with the underlying source file of that web page. The user could then edit that file and save it locally for possible uploading back to the web site through its FTP. MICROSOFT CORPORATION's INTERNET EXPLORER™ also includes a version of the browse-edit paradigm. On selection of an "Edit in FrontPage" button, INTERNET EXPLORER™ starts an instance of MICROSOFT CORPORATION's FRONTPAGE™ in a separate window with the web page file to be edited, again, if the authorizations and file addresses were already set up in advance. Both of these web development environments allow the user to edit the web page and store it locally for future action. However, in order to upload the modified web page to the web site, the file still needs to be communicated to the web site through its file transfer server, typically by a web developer. Therefore, while the browse-edit paradigm streamlines the editing process, the limited amount of editing available to the SME still needs to be uploaded by a web professional.

Moreover, the browse-edit paradigm, of COMPOSER™ and FRONTPAGE™, provides a solution for simple web pages that do not have complex dependencies and links. These development environments are not capable of automatically handling the complex document dependencies and links found in most web pages. Furthermore, COMPOSER™ and FRONTPAGE™ typically may only edit existing pages in the browse-edit paradigm implementation. Because of their deficiencies in handling the links and dependencies, when pages are added or deleted to a web site, COMPOSER™ and FRONTPAGE™ generally do not automatically update and amend the dependencies and links of the other related pages in the web site that may need to be updated to either add the new page or delete references to the deleted page. The browse-edit paradigm practiced by COMPOSER™ and FRONTPAGE™ simply does not have the capability to modify web pages other than the actual page being edited.

BRIEF SUMMARY OF THE INVENTION

The limitations of the browse-edit paradigm are addressed by the web site management lifecycle described herein. A page editing interface is provided to a user that allows the user to seamlessly browse to a web page to be edited, edit that page, including any page-dependant files or links, and publish the edited web page back through the file transfer server without requiring fore knowledge of the file transfer filing system. Each stage of the web site management lifecycle is presented seamless to the user. The browser embedded in the page editor seamlessly morphs to the edit window, appearing to the user to be a single interface environment. Similarly, when the user publishes the edited content back to the web site, the edit window seamlessly morphs back to the browser, which then displays the edited web page to the user through the web server.

Page-related dependencies, such as linked files and images, are maintained within the page editor in addition to the source code of the web page to be edited. In this manner, the dependencies may be maintained throughout the edits. Also, the dependency management allows users to add and subtract entire web pages or dependent files by implementing a process for the page editor to update the links to the new or deleted files.

The web site management lifecycle includes at its core the ability to automatically map the edited files and their dependents to and from the user's local computer and between the web server and file transfer server. This mapping allows the user to automatically download the source files for the web site and its dependencies to be edited and then automatically publish the edited results back to the appropriated locations through the file transfer server associated with the web site. By including each of the capabilities in the single, seamless page editor, each stage of the web site management lifecycle is addressed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 1A-1D are screen shots illustrating one embodiment of the present invention;

FIG. 2 is a flowchart illustrating the core steps executed in the implementation of an embodiment of the present invention;

FIG. 3 is a flowchart illustrating example steps executed in implementing another embodiment of the present invention;

FIG. 4 is a flowchart illustrating example steps executed in implementing an additional embodiment of the present invention.

DETAILED DESCRIPTION OF THE INVENTION

The browse-edit paradigm may be greatly improved by adding an automated publish functionality. A browse-edit-publish paradigm solves the problem of mapping the edited web page back to the web site through the file transfer server. One method for solving this file transfer mapping involves technology developed by MACROMEDIA, INC. Automatic initial discovery of the file transfer root directory for a particular web site is disclosed in concurrently-filed, commonly-owned U.S. patent application Ser. No. 10/689,870, entitled, "AUTOMATIC SET UP FOR EDITING A WEB SITE," the disclosure of which is hereby incorporated herein by reference. The protocol mapping process between the source files as accessed through a web server to the source files accessed through a file transfer server is disclosed in concurrently-filed, commonly-owned U.S. patent application Ser. No. 10/689,860, entitled, "CROSS-PROTOCOL URL MAPPING," the disclosure of which is hereby incorporated herein by reference. The browse-edit-publish paradigm is also enhanced by making the process seamless to the user and handling each of the dependencies for the edited web pages. The creation of a seamless interface and dependent file-handling allows the user to maintain the familiarity with the browsing process, while controlling the whole process of web site maintenance. Therefore, the embodiments of the present invention extend beyond a browse-edit-publish paradigm to a web site management lifecycle.

Figure 1A:
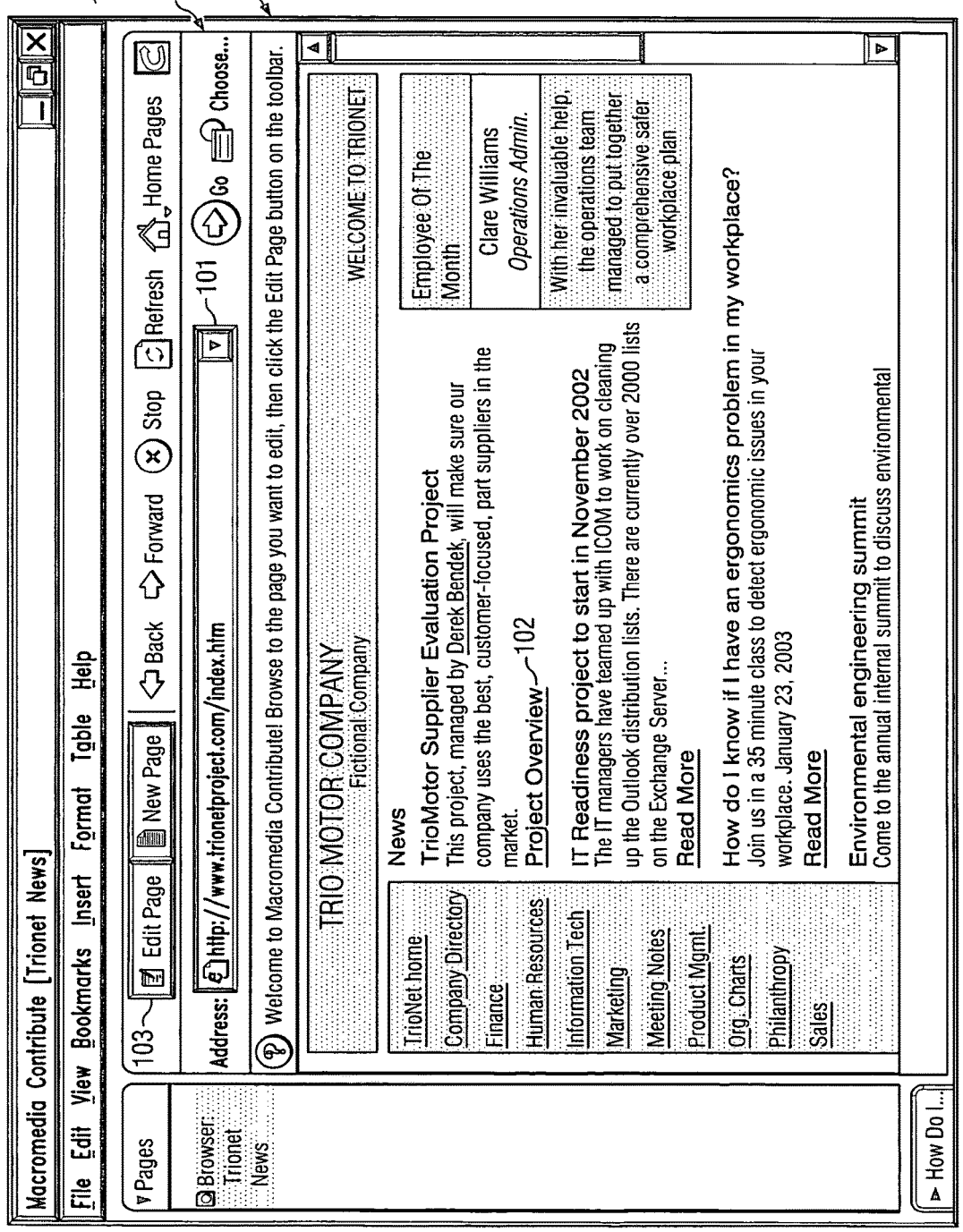

FIG. 1A is a screen shot illustrating one embodiment of the present invention. Page editor 10 is implemented with browser 100. A user may browse, using familiar tasks, to any desired web site using a search engine or by entering a uniform resource locator (URL), such as URL 101, which identifies the main page of the web site, index.htm. Browser 100 includes the typical browser functionality, including the linking capabilities offered with HTTP, but also includes additional features as illustrated by edit button 103. Link 102 is displayed as a typical hyperlink, as may be familiar to the user. For purposes of this example, the user intends to edit the web page linked to by link 102. By actuating link 102, browser 100 requests the associated page for display.

FIG. 1B is a screen shot illustrating page editor 10 displaying the web page associated with link 102 of FIG. 1A. Browser 100 now displays the page which the user desires to edit. URL 104, http://www.trionetproject.com/SuppliersProject.htm, identifies the location of the Suppliers Project page according to the web server's file system. The user may begin the editing of the displayed web page by clicking edit button 103.

Figure 1C:
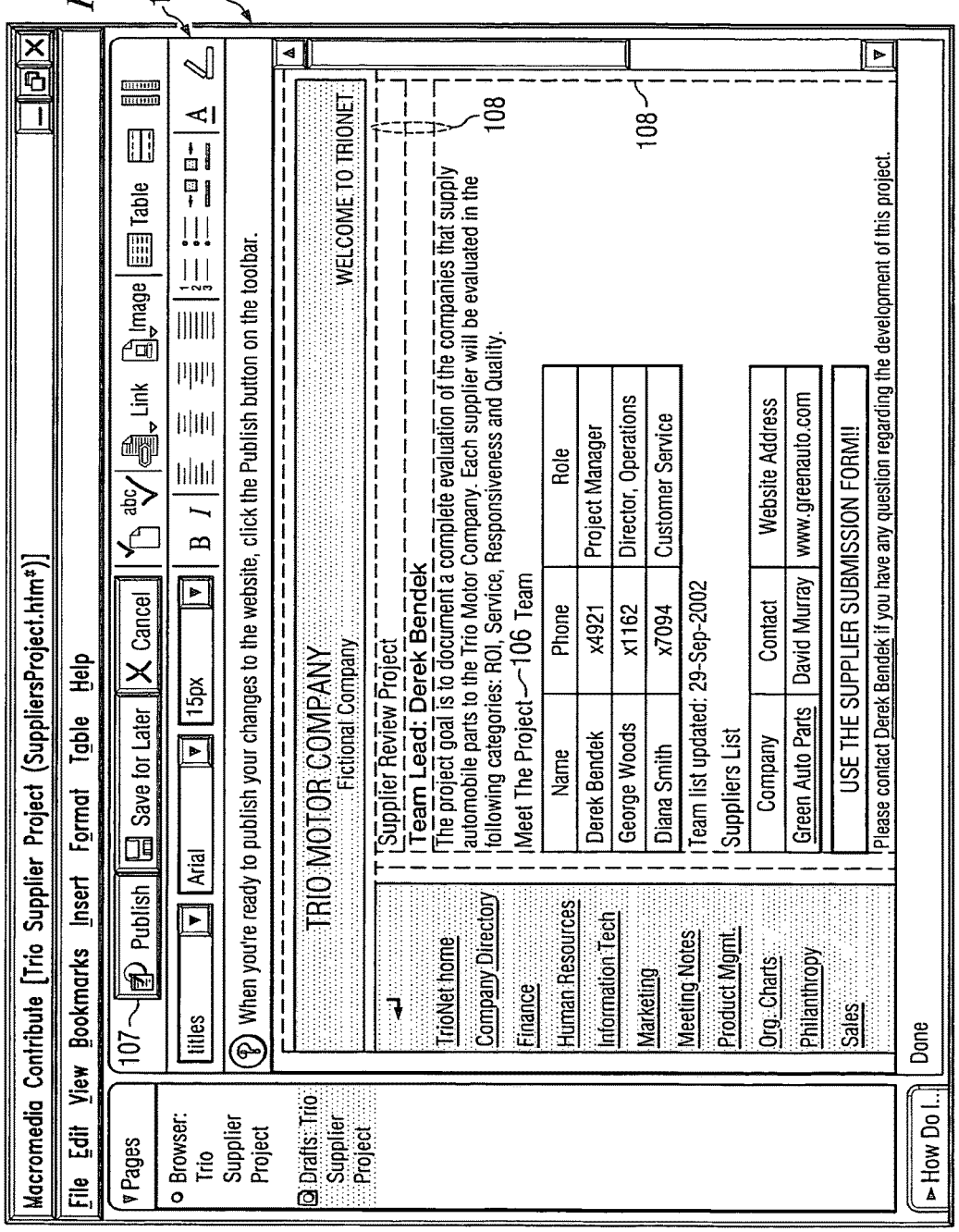

FIG. 1C is a screen shot illustrating page editor 10 in an edit mode. Editing window 105 is actually a different window from browser 100. However, to the user, it appears that editing window 105 is merely a slight modification of browser 100. Editing window 105 is coded to appear over browser 100, giving the appearance that one window morphed into another, or that the same window was slightly modified. This seamless progression to editing window 105 preserves the user's familiarity with the browsing concept. Other visual indicators displayed to the user include field lines 108, identifying the several fields, slices, or sections of the web page and the changes in the toolbar, including the addition of publish button 107. In the illustrated embodiment, the user may modify any of the content within editing window 105. FIG. 1C shows that the user added text 106 to the previous, "Meet The Team" title. When the user is finished editing the web page, he or she may click on Publish button 107 to upload the edited file back to the web site through the file transfer server.

It should be noted that various embodiments of the present invention may safeguard the design and formatting of the web site by restricting the editing ability of the user to only the content or textual information. Moreover, any new documents created by a user may be constrained to the formatting sequence or particular cascading style sheets (CSS). Thus, when a new document is created by the user, it automatically comes up pre-formatted to the specific formatting sequence of CSS used by the rest of the web site, much like a template. One method for implementing these safeguard restrictions is disclosed in concurrently-filed, commonly-owned U.S. patent application Ser. No. 10/690,980, entitled, "CONTENT-RESTRICTED EDITING," the disclosure of which is hereby incorporated herein by reference.

Figure 1D:
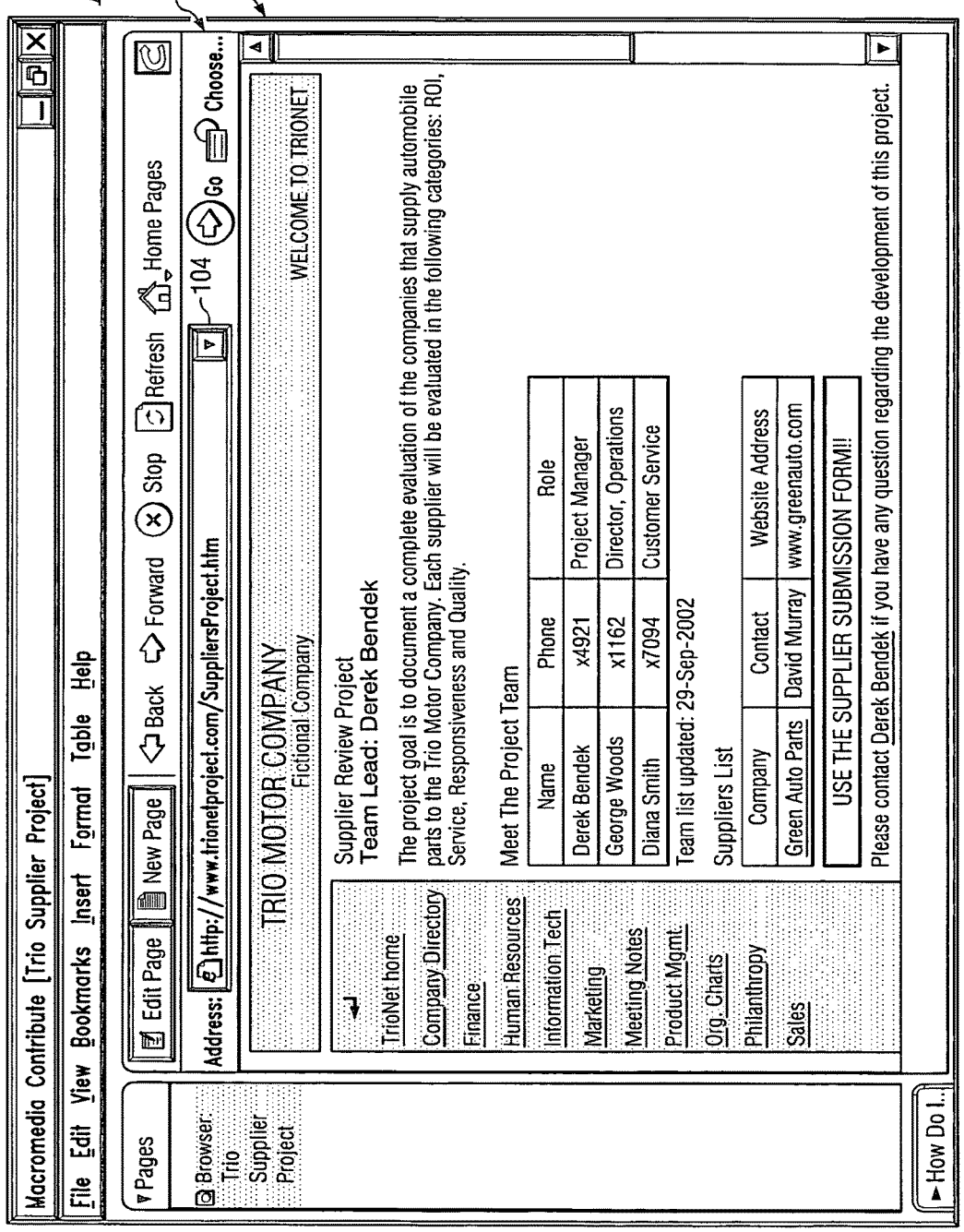

FIG. 1D is a screen shot illustrating page editor 10 displaying the edited web page in browser 100. After activating Publish button 107 (FIG. 1C), page editor 10 seemingly morphs back to browser 100, again giving the user the impression that the edit-publish process is seamless. The newly edited web page at URL 104 is now displayed with the edits in place.

While previous web development environments have included tools to assist in the publishing of the edited web content, none have been capable of automatically browsing, editing, and then publishing the edited web content in a seamless interface. Moreover, previous web development environments have been incapable of handling the dependent file relationships of edited web pages. FIG. 2 is a flowchart illustrating the core steps executed in the implementation of an embodiment of the present invention. In step 200, the user browses to the desired web page to be edited in the same, well-understood manner used in typically web browsers. In step 201, the user edits the web page by activating the editing feature and making the modifications. In step 202, after the user is finished editing, he or she may publish the edited web page and each of its dependencies through the file transfer server of the web site.

FIG. 3 is a flowchart illustrating example steps executed in implementing another embodiment of the present invention. In step 300, the user browses to the web page to be edited. In step 301, the user indicates the desire to edit the page. Upon the edit indication, the system scans the target web page, in step 302, to identify any page-dependent files or links Page-dependent files or links are those files or documents that may be used to display the target web page. For example, a web page may contain images that are, in reality, stored in a separate location, with only a reference to that location contained as a link within that web page. These page-dependent files are generally downloaded to ensure that web page displays correctly in the page editor's embedded web browser. Additionally, some web pages have dynamic content. Therefore, the page-dependent files or links may be links to the associated databases for retrieving the dynamic information.

Once the target web page has been scanned, the underlying source file for the target web page is downloaded via the file transfer server in step 303, along with any of the related, page-dependent files or links. The user may then edit the web page in step 304. Once the edits have been completed, and the user indicates to publish the edited web page, the edited file is scanned once again, in step 305, for any page-dependent files or links that may have been modified, added, or deleted during the editing process. In step 306, the source file for the edited web page along with any of its dependencies that were modified or that are not already on the file transfer server are mapped to the filing system hierarchy of the web site's file transfer server. This mapping includes modification of each of the local links that were made to new files during the editing process. Thus, a new image added to the web page from the user's local disk drive would be remapped to the appropriate address for the file transfer server. In step 307, the edited web page and all of the new or modified dependent files are uploaded to the web site through the file transfer server.

As previously disclosed, the file mapping between the HTTP address methodology and the file transfer address methodology may be implemented by concurrently-filed, commonly-owned, U.S. patent application Ser. No. 10/689, 870, entitled, "AUTOMATIC SET UP FOR EDITING A WEB SITE;" and U.S. patent application Ser. No. 10/689, 860, entitled, "CROSS-PROTOCOL URL MAPPING," the disclosures of which are incorporated herein by reference.

FIG. 4 is a flowchart illustrating example steps executed in implementing an additional embodiment of the present invention. Many modern web sites are developed using scripting languages, such as MACROMEDIA, INC.'s COLDFUSION™ MARKUP LANGUAGE (CFML™), SUN MICROSYSTEMS' JAVA™ SERVER PAGES (JSP™), MICROSOFT CORPORATION's ACTIVE SERVER PAGES™ (ASP™), and the like, which generate HTML on the fly pulling information from databases to fill out the generated web pages. In such cases, there is typically no pre-existing web page to download from the file transfer server. The steps illustrated in FIG. 4 show an embodiment of the present invention that can handle these dynamically created web pages.

In step 400, the user browses to the desired web page to be modified. As the user browses to the specific page, the web server runs the server-side code which generates the HTML for the web page and pulls the information that is inserted into the web page from a related database. In step 401, the user activates the modify function. In response to the modify function activation, the system scans the generated web page, in step 402, to identify the elements of that web page that were generated from the database information. The generated web page and its dependents are then downloaded in step 403 and modified according to the user's preferences in step 404.

After completing the modifications, the user activates the publish function in step 405. In response to the publish function, the modified web page is again scanned, in step 406, to identify the elements generated from the related database that the user modified. These modified database elements are then extracted from the web page in step 407, after which the system uses the file transfer information to modify the content of the database in step 408. Any web page dependents or links that may also have been added are then also updated on the web site in step 409.

Figure 5:
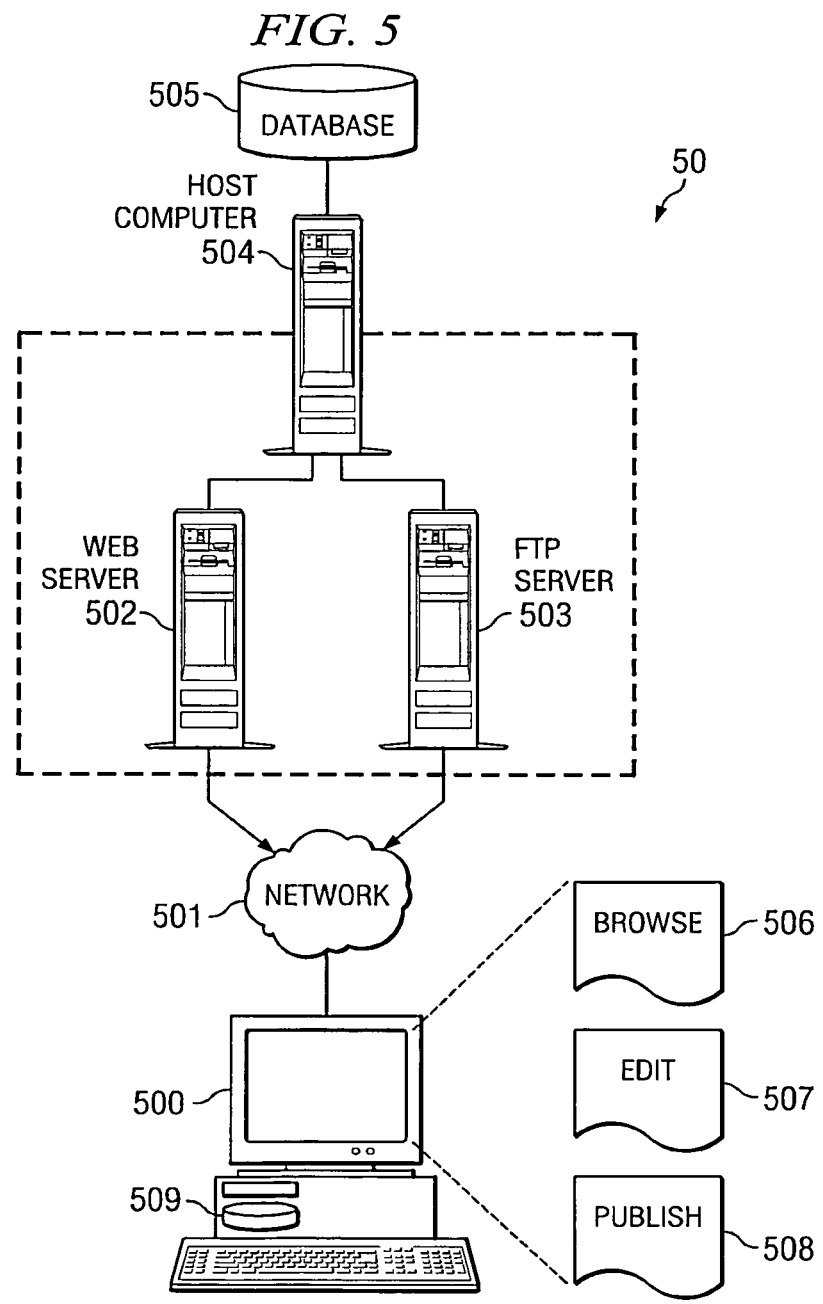
FIG. 5 is a block diagram illustrating an example system running one embodiment of the present invention.

FIG. 5 is a block diagram illustrating example web management system 50 running one embodiment of the present invention. A complex interaction between the client-side and the server-sides occurs in implementing various embodiments of the present invention. When a user on computer 500 desires to "surf" the Internet, a connection is made between the browser running on computer 500 and web server 502 through Internet 501. Web server 502 would contain the web site that the user desired to visit. A typical "surfing" user at computer 500 would not generally access FTP server 503. Host computer 504 may actually be running the software that implements both web server 502 and FTP server 503 and may also hold the underlying source files within its internal memory, or in accessible database 505.

In relation to the present invention, computer 500 runs a page editor that has been configured consistent with an embodiment of the present invention. Upon initiation of the page editor, the editor discovers the root directory corresponding to the web site on FTP server 503. One method for implementing this task is described in concurrently-filed, commonly-owned, U.S. patent application Ser. No. 10/689, 870, entitled, "AUTOMATIC SET UP FOR EDITING A WEB SITE."

As the user enters browse mode 506, the browser embedded within the page editor establishes a connection with web server 502 through Internet 501 to view the desired web site. The user may then browse, through web server 502, to the specific page that he or she desires to edit. When the user selects to enter edit mode 507, the connection with web server 502 is maintained. The page editor scans the source file of the selected web page, which may be viewed from web server 502, to determine the different dependencies, links, or database 505 elements contained within the web page. A connection is then established between computer 500 and FTP server 503 through Internet 501 to access and download the underlying source files for the web page and its page-dependent files, links, or database 505 elements. The connection with web server 502 may be maintained or ended. However, only the connection to FTP server 503 will be visible to the user at computer 500.

Once the appropriate files have been downloaded to computer 500, the user may edit as desired. In some cases, the user may choose to add or delete dependent files or even entire web pages. When such files or pages are added, they would be stored locally on local storage 509. As the user edits the web pages, the links to the appropriate new files and pages would reference the URL to local storage 509. When the user is finished editing, he or she enters publish mode 508.

Upon entry of publish mode 508, the page editor again scans the edited file for modifications in the page-dependent files, links, and database 505 elements. In preparation for uploading the edited web page, the page editor maps all of the new documents, whether they are modifications of the existing page-dependent files or whether they are wholly new web pages or new page-dependent files, to the appropriated location addresses for the filing system of FTP server 503. A method for implementing this cross-protocol mapping is disclosed in concurrently-filed, commonly-owned U.S. patent application Ser. No. 10/689,860 entitled, "CROSS-PROTOCOL URL MAPPING." Moreover, any links within the modified web page to files that had been added and stored locally during the editing process will be updated to reflect the appropriate file transfer addresses appropriated for those files, or their links would be removed if the associated file was also deleted. Once this mapping has occurred, computer 500 uploads the modified web page to its appropriated location on host computer 504 and/or database 505 through FTP server 503. This may include updating database 505 with modified, added, or deleted database elements in examples where the modified web page is a dynamically-generated web page. The completion of publish mode 508 returns the user automatically and seamlessly to browse mode 506, in which the connection with web server 502 is either brought to the front again or reestablished.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed:

1. A computer-implemented method, comprising:
   downloading, by a computing device, from a file transfer server to a local file system of a storage device of the computing device, a source file of a web page and page-dependent files, wherein the page-dependent files comprise files on which the web page depends for display, wherein references within the source file of the web page to the page-dependent files are mapped to corresponding addresses within the local file system at which the page-dependent files are stored;
   executing, by the computing device, an editing interface for editing the web page;
   rendering, by the computing device, the web page in the editing interface, wherein rendering the web page includes accessing the source file of the web page and the page-dependent files from the corresponding addresses within the local file system;
   in response to input, received via the editing interface, defining one or more edits to the rendered web page, editing, by the computing device, the source file of the web page;
   in response to further input, received via the editing interface, indicating that the web page as edited is to be published, scanning, by the computing device, the source file of the web page to identify any modifications to the references to the page-dependent files and any references to new page-dependent files corresponding to said one or more edits; and
   preparing, by the computing device, the source file, the page-dependent files and said any new page-dependent files to be uploaded to the file transfer server, wherein said preparing includes remapping said any modifications to the references to the page-dependent files and said any references to new page-dependent files to appropriate corresponding addresses of a file system accessible by the file transfer server.

2. The method of claim 1, wherein the editing interface is provided by a page editing application.

3. The method of claim 1, wherein preparing the source file, the page-dependent files and said any new page-dependent files to be uploaded to the file transfer server comprises providing the source file, the page-dependent files and any new page-dependent files to a database accessible via the file transfer server.

4. The method of claim 1, wherein editing the source file comprises changing the content of the source file, including modifications to the references to the page-dependent files stored within the local file system.

5. The method of claim 1, wherein the file transfer server comprises a file transfer protocol server.

6. The method of claim 1, wherein at least one of the page-dependent files defines dynamic content of the web page.

7. The method of claim 1, wherein the file transfer server comprises a file transfer protocol server.

8. A computer-implemented method, comprising:
   receiving, by a computing device, data identifying a web page to be edited;
   based on the data, accessing, by the computing device, a source file of the web page and page-dependent files associated with the web page from one or more database, wherein the page-dependent files comprise files on which the web page depends for display;
   providing the source file and the page-dependent files to a second computing device for editing by the second computing device, wherein references within the source file to the page-dependent files are mapped to corresponding addresses within a file system hierarchy of the second computing device at which the page-dependent files are stored;
   receiving a modified source file of a modified version of the webpage and at least one modified page-dependent file from the second computing device, wherein the modified source file is scanned to identify any modifications to the references to the at least one modified page-dependent file, and wherein said any modifications to the references to the at least one modified page-dependent file are remapped to appropriate corresponding addresses of a file system hierarchy of the one or more database; and updating the one or more database to store the modified source file and to store the at least one modified page-dependent files at the appropriate corresponding addresses.

9. The method of claim 8, wherein the second computing device comprises a client device providing an editing interface for editing a rendered representation of the web page.

10. The method of claim 8, wherein at least one of the page-dependent files defines dynamic content of the web page.

11. The method of claim 8,
wherein the modified source file is further scanned to identify any references new page-dependent files and wherein said any references to new page-dependent files are remapped to appropriate corresponding addresses of the file system hierarchy of the one or more database; and
wherein the one or more database is further updated to store the any new page-dependent files at said appropriate corresponding addresses.

12. A system, comprising:
a first computing device configured to execute a web page editing process to (i) provide an editing interface comprising a rendered view of a web page to be edited based on a source file of the web page and page-dependent files of the web page obtained from a file transfer server, wherein the page-dependent files comprise files on which the web page depends for display and wherein references within the source file to the page-dependent files are mapped to respective addresses within the local file system of the first computing device at which the page-dependent files are stored, (ii) receive in response to receiving, via the editing interface, an edit to the rendered web page, editing the source file, thereby creating an edited version of the source file, and (iii) return the edited version of the source file and any modified page-dependent files and any new page-dependent files to the file transfer server; and
the file transfer server configured to execute a storage process that acts in response to commands from the web page editing process to:
receive the modified source file, the any modified page-dependent files, and the any new page-dependent files from the first computing device, wherein the modified source file is scanned to identify any modifications to the references to the any modified page-dependent files and the any new page-dependent files, and wherein said any modifications to said references are remapped to appropriate corresponding addresses of a file system hierarchy of one or more storage device accessible by the file transfer server; and
update the one or more storage device accessible by the file transfer server to store the source file and to store the any modified page-dependent files and the any new page-dependent files at the appropriate corresponding addresses of the one or more storage device.

13. The system of claim 12, wherein the one or more storage device accessible by the file transfer server comprises one or more database.

14. The system of claim 12, wherein the web page editing process is implemented by a web page editing application.

15. The system of claim 12, wherein the file transfer server comprises a file transfer protocol server.

16. The computer-implemented method of claim 12, wherein the page-dependent files comprise linked files or linked images on which the web page depends for display.

17. A system, comprising:
at least one processor;
a storage device; and
a memory storing program instructions, wherein execution of the program instructions by the at least one processor causes the at least one processor to perform operations comprising:
downloading, from a file transfer server to a local file system of the storage device, a source file of a web page and page-dependent files, wherein the page-dependent files comprise files on which the web page depends for display, wherein references within the source file of the web page to the page-dependent files are mapped to corresponding addresses within the local file system at which the page-dependent files are stored;
executing an editing interface for editing the web page;
rendering the web page in the editing interface, wherein rendering the web page includes accessing the source file of the web page and the page-dependent files from the corresponding addresses within the local file system;
in response to input, received via the editing interface, defining one or more edits to the rendered web page, editing the source file of the web page;
in response to further input, received via the editing interface, indicating that the web page as editing is to be published, scanning, by the computing device, the source file of the web page to identify any modifications to the references to the page-dependent files and any references to new page-dependent files corresponding to said one or more edits; and
preparing the source file, the page-dependent files and any said new page-dependent files to be uploaded to the file transfer server, wherein said preparing includes remapping said any modifications to the references to the page-dependent files and said any references to new page-dependent files to appropriate corresponding addresses of a file system accessible by the file transfer server.

18. The system of claim 17, wherein at least one of the page-dependent files defines dynamic content of the web page.

19. A non-transitory computer-readable storage medium storing program instructions that, when executed by a computing device, cause the computing device to perform functions comprising:
downloading, by the computing device, from a file transfer server to a local file system of a storage device of the computing device, a source file of a web page and page-dependent files, wherein the page-dependent files comprises files on which the web page depends for display, wherein references within the source file of the web page to the page-dependent files are mapped to corresponding addresses within the local file system at which the page-dependent files are stored;
executing, by the computing device, an editing interface for editing the web page;
rendering, by the computing device, the web page in the editing interface, wherein rendering the web page includes accessing the source file of the web page and the page-dependent files from the corresponding addresses within the local file system;

in response to input, received via the editing interface, defining one or more edits to the rendered web page, editing, by the computing device, the source file of the web page;

in response to further input, received via the editing interface, indicating that the web page as edited is to be published, scanning, by the computing device, the source file of the web page to identify any modifications to the references to the page-dependent files and any references to new page-dependent files corresponding to said one or more edits; and preparing, by the computing device, the source file, the page-dependent files and said any new page-dependent files to be uploaded to the file transfer server, wherein said preparing includes remapping said any modifications to the references to the page-dependent files and said any references to new page-dependent files to appropriate corresponding addresses of a file system accessible by the file transfer server.

20. The non-transitory computer-readable storage medium of claim 19, wherein at least one of the page-dependent files defines dynamic content of the web page.

\* \* \* \* \*